(12) United States Patent
Pegg et al.

(10) Patent No.: US 12,358,660 B2
(45) Date of Patent: Jul. 15, 2025

(54) ACCESSORY PORT SYSTEMS AND METHODS FOR UNMANNED AERIAL VEHICLES

(71) Applicant: FLIR Unmanned Aerial Systems ULC, Vancouver (CA)

(72) Inventors: Albert Pegg, Waterloo (CA); Tomi Kanninen, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 381 days.

(21) Appl. No.: 17/853,019

(22) Filed: Jun. 29, 2022

(65) Prior Publication Data

US 2023/0002046 A1  Jan. 5, 2023

Related U.S. Application Data

(60) Provisional application No. 63/217,224, filed on Jun. 30, 2021.

(51) Int. Cl.
| | | |
|---|---|---|
| *B64U 10/25* | (2023.01) | |
| *B64D 27/00* | (2006.01) | |
| *B64D 47/00* | (2006.01) | |
| *B64U 10/14* | (2023.01) | |
| *B64U 20/40* | (2023.01) | |
| *H04B 7/185* | (2006.01) | |

(52) U.S. Cl.
CPC ............. *B64U 20/40* (2023.01); *B64D 27/00* (2013.01); *B64D 47/00* (2013.01); *B64U 10/14* (2023.01); *B64U 10/25* (2023.01); *H04B 7/18502* (2013.01); *B64U 2201/20* (2023.01)

(58) Field of Classification Search
CPC ........ B64U 10/25; B64U 10/14; B64U 20/40; B64U 20/80; B64U 20/83; B64U 2201/202; B64U 2201/20; B64U 50/30; B64D 27/00; B64D 47/00; H04B 7/18502
See application file for complete search history.

(56) References Cited

U.S. PATENT DOCUMENTS

| | | | |
|---|---|---|---|
| 8,910,557 B2 | 12/2014 | Cox et al. | |
| 9,663,173 B2 | 5/2017 | Wadey et al. | |
| 10,423,169 B2* | 9/2019 | Cantrell | G05D 1/0027 |
| 10,520,953 B2* | 12/2019 | Cantrell | B60L 53/68 |
| 10,538,316 B2* | 1/2020 | Chen | B64U 30/29 |
| 10,903,474 B2* | 1/2021 | Halgasik | B64U 50/30 |

(Continued)

FOREIGN PATENT DOCUMENTS

EP  3167535 B1  5/2017

*Primary Examiner* — Benjamin P Lee
(74) *Attorney, Agent, or Firm* — Haynes and Boone, LLP

(57) ABSTRACT

Accessory port systems and methods are provided. In one example, an unmanned aerial vehicle (UAV) includes an accessory port configured to interchangeably attach a plurality of accessory devices to the UAV. The accessory port may have a mechanical interface configured to engage with one of the accessory devices. The mechanical interface may include a locking member configured to physically secure the accessory device to the accessory port. The accessory port may further include an electrical interface configured to electrically connect the accessory device to the UAV. The mechanical interface may be configured to align the accessory device relative to the electrical interface. Related devices, systems, and methods are also provided.

20 Claims, 15 Drawing Sheets

(56) References Cited

U.S. PATENT DOCUMENTS

| | | | | |
|---|---|---|---|---|
| 11,396,375 B2 * | 7/2022 | Teetzel | .................... | B64U 50/39 |
| 11,501,483 B2 * | 11/2022 | Speasl | .................... | G06V 20/17 |
| 11,650,036 B2 * | 5/2023 | Raji | ..................... | F42C 11/006 |
| | | | | 89/6.5 |
| 11,787,566 B2 * | 10/2023 | Chen | ...................... | B64U 10/13 |
| | | | | 244/2 |
| 11,939,056 B2 * | 3/2024 | Kennedy | .............. | G08G 5/0013 |
| 12,049,317 B2 * | 7/2024 | Teetzel | .................... | B64D 1/18 |
| 2009/0283629 A1 * | 11/2009 | Kroetsch | ................ | B64U 20/40 |
| | | | | 244/17.23 |
| 2010/0123042 A1 | 5/2010 | Ballard et al. | | |
| 2014/0061376 A1 * | 3/2014 | Fisher | ................... | B64U 10/70 |
| | | | | 244/62 |
| 2017/0144751 A1 * | 5/2017 | Yu | ......................... | B64C 27/001 |
| 2018/0362157 A1 * | 12/2018 | Teetzel | ................ | B64U 30/294 |
| 2019/0373173 A1 * | 12/2019 | Wang | .................. | G03B 15/006 |
| 2020/0223548 A1 * | 7/2020 | Kennedy | .............. | G08G 5/0069 |
| 2021/0053679 A1 * | 2/2021 | Johannesson | .......... | B64U 20/80 |
| 2021/0284335 A1 * | 9/2021 | Mclaughlin | ............... | B64F 1/18 |
| 2022/0396347 A1 * | 12/2022 | Neill | ..................... | G05D 1/104 |
| 2024/0228074 A1 * | 7/2024 | Kozlenko | ............. | B64U 10/14 |
| 2024/0228076 A1 * | 7/2024 | Kozlenko | ............. | B64U 50/30 |

* cited by examiner

ACCESSORY PORT SYSTEMS AND METHODS FOR UNMANNED AERIAL VEHICLES

CROSS REFERENCE TO RELATED APPLICATIONS

This application claims priority to and the benefit of U.S. Provisional Patent Application No. 63/217,224 filed Jun. 30, 2021 and entitled "ACCESSORY PORT SYSTEMS AND METHODS FOR UNMANNED AERIAL VEHICLES," which is incorporated herein by reference in its entirety.

TECHNICAL FIELD

The present invention relates generally to unmanned aerial vehicles and, more particularly, to accessory port systems and methods for unmanned aerial vehicles.

BACKGROUND

Modern unmanned sensor platforms, such as unmanned aerial vehicles (UAVs), are able to operate over long distances and in various environments (e.g., rural, urban, undeveloped). In particular, UAVs are used to support a wide range of real-world applications including surveillance, reconnaissance, exploration, item transportation, disaster relief, aerial photography, large-scale agriculture monitoring, and others. In many cases, a UAV may be equipped with a variety of different devices, such as different types of sensors and navigation devices, and may be configured to address a broad variety of operational needs. However, equipping such devices has traditionally been limited as UAVs are generally configured to have specific/custom configurations (e.g., a set of specific/custom devices) that do not allow for functionality changes of the UAV without significant reconfiguration of the UAV by a user. Thus, there exists a need for systems and methods that provide greater UAV versatility, such as in terms of future expansion and capabilities.

SUMMARY

In one or more embodiments, a UAV includes an accessory port configured to interchangeably attach a plurality of accessory device to the UAV. The accessory port may include a mechanical interface configured to engage with one of the accessory devices. The mechanical interface may have a locking member configured to physically secure the accessory device to the accessory port. The accessory port may further include an electrical interface configured to electrically connect the accessory device to the UAV. The mechanical interface may further be configured to align the accessory device relative to the electrical interface.

In one or more embodiments, a method includes connecting an accessory device to an accessory port of a UAV. The accessory device may be configured to interchangeably attach to a plurality of accessory devices to the UAV. Connecting the accessory device to the accessory port may include engaging the accessory device with a mechanical interface of the accessory port, where the mechanical interface has a locking member configured to physically secure the accessory device to the accessory port. Connecting the accessory device to the accessory port may further include electrically connecting the accessory device to an electrical interface of the accessory port, where the mechanical interface aligns the accessory device relative to the electrical interface in the electrically connecting.

The method may further include detecting, via a sensor disposed in the mechanical interface, the engagement of the accessory device with the mechanical interface and/or electrical interface. For example, the sensor may detect a magnetic field induced by a magnet disposed in the accessory device. In other examples, the sensor may operate using one or more physical contacts and/or one or more electrical connections. The method may further include retrieving, via the electrical interface, identification information associated with the accessory device in response to a detection of a presence of the accessory device. The identification information may identify a capability provided by the accessory device and the method may further include integrating the capability into an operation of the UAV.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
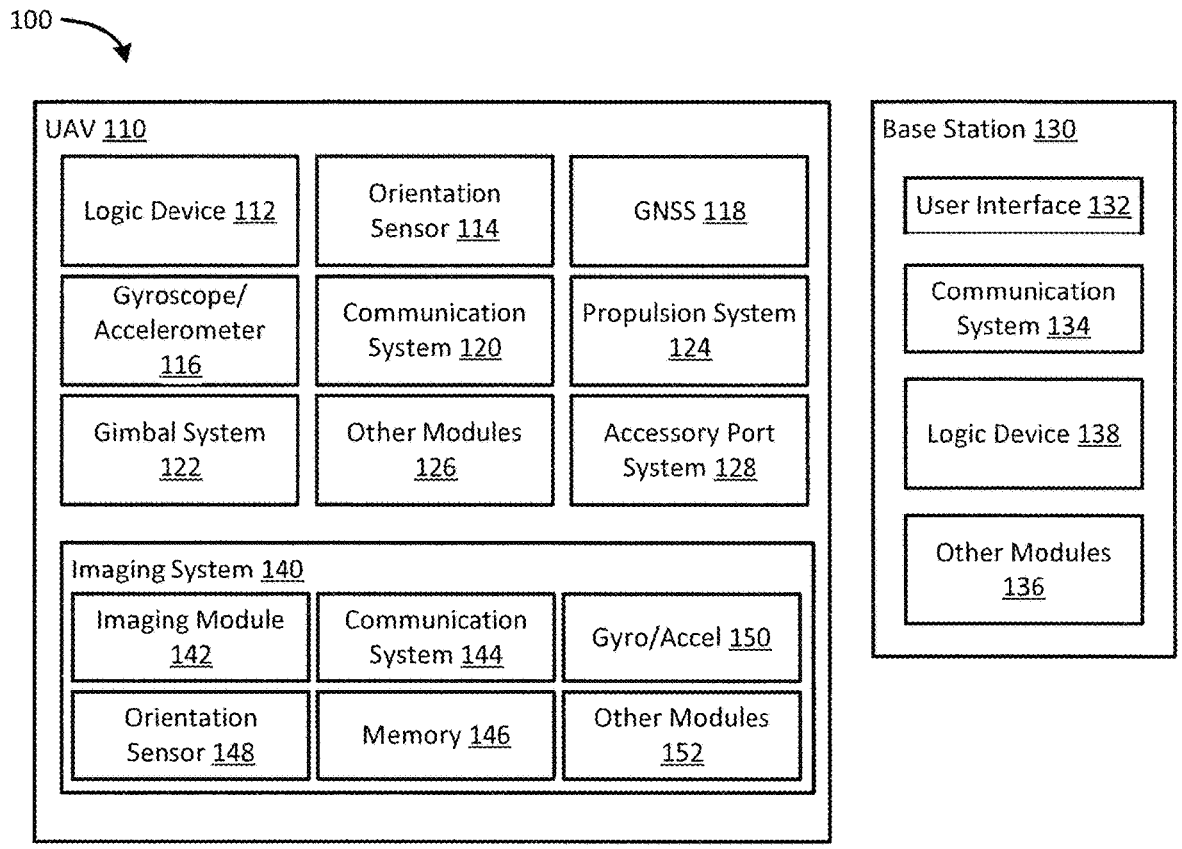
FIG. 1 illustrates a block diagram of a survey system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

UAVs generally do not have ancillary ports that allow for versatile attachment of various accessory devices to improve, enhance, and scale a UAV's capabilities. Existing UAV systems are configured to have specific/custom configurations (e.g., are limited to a certain set of specific/custom accessory devices), which do not allow for functionality changes of the UAV system by a user. Oftentimes accessory devices in existing UAV systems are limited by a main payload interface configuration and require reconfiguration of the UAV system. In accordance with various embodiments described herein, an accessory device may be developed and attached to a UAV without disrupting/using a main payload interface or requiring significant reconfiguration of a UAV system. Various systems and methods related to interchangeable and field-replaceable accessory device attachment interfaces (e.g., accessory ports and accessory port interfaces) are disclosed herein to provide greater UAV versatility, such as in terms of future expansion and capabilities for UAV systems.

For example, in an embodiment, an accessory device may be connected to an accessory port of a UAV. The accessory port may be configured for interchangeable attachment of a plurality of accessory devices to the UAV. The accessory port may have a mechanical interface configured to engage with the accessory device and physically secure the accessory device to the accessory port (e.g., by using a locking member of the mechanical interface). The accessory port may have an electrical interface configured to electrically connect the accessory device to the UAV, where the mechanical interface aligns the accessory device relative to the electrical interface when the accessory device is connected to the accessory port. The accessory port may automatically provide a detection signal to the UAV indicating that the accessory device has been connected to the accessory port. In response to the automatic detection of the accessory device, the UAV may automatically identify the accessory device (e.g., by retrieving identification information from the accessory device) and automatically or selectively adjust its functionality based on the identification of accessory device. For example, the UAV may have different embedded functional parameter set(s) and change/adjust its functional parameters based on the identity of the accessory device that has been attached to the UAV. In some embodiments, different/new functional parameter set(s) could be introduced to the UAV by attaching an accessory device to the UAV. For example, functional parameter set(s) may be downloaded from the accessory device upon detection and identification of the accessory device, and the downloaded functional parameter set(s) may be integrated into an operation of the UAV. In various embodiments, a user may be able to control which functional parameter set(s) are integrated into an operation of the UAV through a base station user interface. For example, the UAV may send the detection and identification information to the base station and in turn may receive instructions, selected by the user, for integrating certain functional parameters into the operation of the UAV. Further embodiments and details are described below in reference to the accompanying figures of the disclosure.

FIG. 1 illustrates a block diagram of a survey system 100 including a UAV 110 in accordance with one or more embodiments of the present disclosure. In various embodiments, the survey system 100 and/or elements of the survey system 100 may be configured to fly over a scene or survey area, to fly through a structure, or to approach a target and image or sense the scene, structure, or target, or portions thereof, using a gimbal system 122 to aim an imaging system/sensor payload 140 at the scene, structure, or target, or portions thereof, for example. Resulting imagery and/or other sensor data may be processed (e.g., by the sensor payload 140, UAV 110, and/or base station 130) and displayed to a user through use of a user interface 132 (e.g., one or more displays such as a multi-function display (MFD), a portable electronic device such as a tablet, laptop, or smart phone, or other appropriate interface) and/or stored in memory for later viewing and/or analysis. In some embodiments, the survey system 100 may be configured to use such imagery and/or sensor data to control operation of the UAV 110 and/or the sensor payload 140, as described herein, such as controlling the gimbal system 122 to aim the sensor payload 140 towards a particular direction, and/or controlling a propulsion system 124 to move the UAV 110 to a desired position in a scene or structure or relative to a target.

In the embodiment shown in FIG. 1, the survey system 100 includes the UAV 110, base station 130, and at least one imaging system/sensor payload 140. The UAV 110 may be implemented as a UAV configured to move or fly and position and/or aim the sensor payload 140 (e.g., relative to a designated or detected target). As shown in FIG. 1, the UAV 110 may include one or more of a logic device 112, an orientation sensor 114, a gyroscope/accelerometer 116, a global navigation satellite system (GNSS) 118, a communication system 120, a gimbal system 122, a propulsion system 124, and other modules 126. Operation of the UAV 110 may be substantially autonomous and/or partially or completely controlled by the base station 130, which may include one or more of a user interface 132, a communications module 134, a logic device 138, and other modules 136. In other embodiments, the UAV 110 may include one or more of the elements of the base station 130, such as with various types of manned aircraft, terrestrial vehicles, and/or surface or subsurface watercraft. The sensor payload 140 may be physically coupled to the UAV 110 and be configured to capture sensor data (e.g., visible spectrum images, infrared images, narrow aperture radar data, and/or other sensor data) of a target position, area, and/or object(s) as selected and/or framed by operation of the UAV 110 and/or the base station 130. In some embodiments, one or more of the elements of the survey system 100 may be implemented in a combined housing or structure that can be coupled to or within the UAV 110 and/or held or carried by a user of the survey system 100.

The logic device 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of the UAV 110 and/or other elements of the survey system 100, such as the gimbal system 122, for example. Such software instructions may also implement methods for processing infrared images and/or other sensor signals, determining sensor information, providing user feedback (e.g., through the user interface 132), querying devices for operational parameters, selecting operational parameters for devices, or performing any of the various operations described herein (e.g., operations performed by logic devices of various elements of the survey system 100).

In addition, a non-transitory medium may be provided for storing machine readable instructions for loading into and execution by the logic device 112. In these and other embodiments, the logic device 112 may be implemented with other components where appropriate, such as volatile memory, non-volatile memory, one or more interfaces, and/or various analog and/or digital components for interfacing with devices of the survey system 100. For example, the logic device 112 may be adapted to store sensor signals, sensor information, parameters for coordinate frame transformations, calibration parameters, sets of calibration points, and/or other operational parameters, over time, for example, and provide such stored data to a user using the user interface 132. In some embodiments, the logic device 112 may be integrated with one or more other elements of the UAV 110, for example, or distributed as multiple logic devices within the UAV 110, base station 130, and/or sensor payload 140.

In some embodiments, the logic device 112 may be configured to substantially continuously monitor and/or store the status of and/or sensor data provided by one or more elements of the UAV 110, sensor payload 140, and/or base station 130, such as the position and/or orientation of the UAV 110, imaging system 140, and/or base station 130, for example. In various embodiments, sensor data may be monitored and/or stored by the logic device 112 and/or processed or transmitted between elements of the survey system 100 substantially continuously throughout operation of the survey system 100, where such data includes various types of sensor data, control parameters, and/or other data (e.g., for accessory device detection).

The orientation sensor 114 may be implemented as one or more of a compass, float, accelerometer, and/or other device capable of measuring an orientation of the UAV 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of the survey system 100. In some cases, a yaw and/or position of the UAV 110 may be adjusted to better position/orient the UAV 110. The gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of the UAV 110 and/or other elements of the survey system 100 and providing such measurements as sensor signals and/or data that may be communicated to other devices of the survey system 100 (e.g., user interface 132, logic device 112, logic device 138). The GNSS 118 may be implemented according to any global navigation satellite system, including a GPS, GLONASS, and/or Galileo based receiver and/or other device capable of determining absolute and/or relative position of the UAV 110 (e.g., or an element of the UAV 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of the survey system 100. In some embodiments, the GNSS 118 may include an altimeter, for example, or may be used to provide an absolute altitude.

The communication system 120 may be implemented as any wired and/or wireless communications module configured to transmit and receive analog and/or digital signals between elements of the survey system 100. For example, the communication system 120 may be configured to receive flight control signals and/or data from the base station 130 and provide them to the logic device 112 and/or propulsion system 124. In other embodiments, the communication system 120 may be configured to receive images and/or other sensor information (e.g., visible spectrum and/or infrared still images or video images) from the sensor payload 140 and relay the sensor data to the logic device 112 and/or base station 130. In some embodiments, the communication system 120 may be configured to support spread spectrum transmissions, for example, and/or multiple simultaneous communications channels between elements of the survey system 100. Wireless communication links may include one or more analog and/or digital radio communication links, such as WiFi and others, as described herein, and may be direct communication links established between elements of the survey system 100, for example, or may be relayed through one or more wireless relay stations configured to receive and retransmit wireless communications. Communication links established by the communication system 120 may be configured to transmit data between elements of the survey system 100 substantially continuously throughout operation of the survey system 100, where such data includes various types of sensor data, control parameters, and/or other data.

The gimbal system 122 may be implemented as an actuated gimbal mount, for example, that may be controlled by the logic device 112 to stabilize the sensor payload 140 relative to a target (e.g., a target object or location) or to aim the sensor payload 140 or components coupled thereto according to a desired direction and/or relative orientation or position. As such, the gimbal system 122 may be configured to provide a relative orientation of the sensor payload 140 (e.g., relative to an orientation of the UAV 110) to the logic device 112 and/or communication system 120 (e.g., gimbal system 122 may include its own orientation sensor 114). In other embodiments, the gimbal system 122 may be implemented as a gravity driven mount (e.g., non-actuated). In various embodiments, the gimbal system 122 may be configured to provide power, support wired communications, and/or otherwise facilitate operation of articulated the sensor/sensor payload 140. In further embodiments, the gimbal system 122 may be configured to couple to a laser pointer, range finder, and/or other device, for example, to support, stabilize, power, and/or aim multiple devices (e.g., the sensor payload 140 and one or more other devices) substantially simultaneously.

In some embodiments, the gimbal system 122 may be adapted to rotate the sensor payload 140 ±90 degrees, or up to 360 degrees, in a vertical plane relative to an orientation and/or position of the UAV 110. In further embodiments, the gimbal system 122 may rotate the sensor payload 140 to be parallel to a longitudinal axis or a lateral axis of the UAV 110 as the UAV 110 yaws, which may provide 360 degree ranging and/or imaging in a horizontal plane relative to UAV 110. In various embodiments, logic device 112 may be configured to monitor an orientation of gimbal system 122 and/or sensor payload 140 relative to UAV 110, for example, or an absolute or relative orientation of an element of sensor payload 140. Such orientation data may be transmitted to other elements of system 100 for monitoring, storage, or further processing, as described herein.

The propulsion system 124 may be implemented as one or more propellers, rotors, turbines, or other thrust-based propulsion systems, and/or other types of propulsion systems that can be used to provide motive force and/or lift to the UAV 110 and/or to steer the UAV 110. In some embodiments, the propulsion system 124 may include multiple propellers (e.g., a tri, quad, hex, oct, or other type "copter") that can be controlled (e.g., by the logic device 112 and/or the logic device 138) to provide lift and motion for the UAV 110 and to provide an orientation for UAV 110. In other embodiments, the propulsion system 124 may be configured primarily to provide thrust while other structures of the UAV 110 provide lift, such as in a fixed wing embodiment (e.g., where wings provide the lift) and/or an aerostat embodiment (e.g., balloons, airships, hybrid aerostats). In various embodiments, the propulsion system 124 may be implemented with a portable power supply, such as a battery and/or a combustion engine/generator and fuel supply.

Accessory port system 128 may include one or more accessory ports. In some embodiments, the accessory port(s) may be disposed on a main structure (e.g., body, frame) of the UAV 110. For example, the accessory ports may be disposed on the UAV 110 so as to not interfere with a main payload (e.g., imaging system 140). A plurality of interchangeable accessory devices may be connected to the accessory ports to provide additional functionality/capabilities to the UAV as described herein. For example, each of the interchangeable accessory devices may have a port interface attached thereto that allows it to connect to one or more of the accessory ports. The accessory port system 128 may operate independently from a main payload system such as imaging system 140 so that attaching accessory devices to the accessory port system 128 does not require a reconfiguration or interference in operation of the main payload. In some embodiments, the accessory port system 128 may be electrically coupled to the logic device 112 (and other elements of the UAV 110) to perform one or more operations as described herein.

Other modules 126 may include other and/or additional sensors, actuators, communications modules/nodes, and/or user interface devices, for example, and may be used to provide additional environmental information related to operation of the UAV 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of the survey system 100 (e.g., logic device 112) to provide operational control of the UAV 110 and/or the survey system 100.

In some embodiments, other modules 126 may include one or more actuated and/or articulated devices (e.g., light emitting devices (e.g., light emitting diodes), multi-spectrum active illuminators, visible and/or IR cameras, radars, sonars, and/or other actuated devices) coupled to the UAV 110, where each actuated device includes one or more actuators adapted to adjust an orientation of the device, relative to the UAV 110, in response to one or more control signals (e.g., provided by the logic device 112). In particular, other modules 126 may include a stereo vision system configured to provide image data that may be used to calculate or estimate a position of the UAV 110, for example, or to calculate or estimate a relative position of a navigational hazard in proximity to the UAV 110. In various embodiments, the logic device 112 may be configured to use such proximity and/or position information to help safely pilot the UAV 110 and/or monitor communication link quality, as described herein.

The user interface 132 of the base station 130 may be implemented as one or more of a display, a touch screen, a keyboard, a mouse, a joystick, a knob, a steering wheel, a yoke, and/or any other device capable of accepting user input and/or providing feedback to a user. In various embodiments, the user interface 132 may be adapted to provide user input (e.g., as a type of signal and/or sensor information transmitted by the communication system 134 of the base station 130) to other devices of the survey system 100, such as the logic device 112. The user interface 132 may also be implemented with logic device 138 (e.g. similar to logic device 112), which may be adapted to store and/or execute instructions, such as software instructions, implementing any of the various processes and/or methods described herein. For example, the user interface 132 may be adapted to form communication links and transmit and/or receive communications (e.g., infrared images and/or other sensor signals, control signals, sensor information, user input, accessory device control, and/or other information), for example, or to perform various other processes and/or methods described herein (e.g., via logic device 138 and communication system 134).

In one embodiment, the user interface 132 may be adapted to display a time series of various sensor information and/or other parameters as part of or overlaid on a graph or map, which may be referenced to a position and/or orientation of the UAV 110 and/or other elements of the survey system 100. For example, the user interface 132 may be adapted to display a time series of positions, headings, and/or orientations of the UAV 110 and/or other elements of the survey system 100 overlaid on a geographical map, which may include one or more graphs indicating a corresponding time series of actuator control signals, sensor information, and/or other sensor and/or control signals.

In some embodiments, the user interface 132 may be adapted to accept user input including a user-defined target heading, waypoint, route, and/or orientation for an element of the survey system 100, for example, and to generate control signals to cause the UAV 110 to move according to the target heading, route, and/or orientation, or to aim the sensor payload 140 accordingly. In other embodiments, the user interface 132 may be adapted to accept user input modifying a control loop parameter of the logic device 112, for example. In further embodiments, the user interface 132 may be adapted to accept user input including a user-defined target altitude, orientation, and/or position for an actuated or articulated device (e.g., the sensor payload 140) associated with the UAV 110, for example, and to generate control signals for adjusting an orientation and/or position of the actuated device according to the target altitude, orientation, and/or position. Such control signals may be transmitted to the logic device 112 (e.g., using the communication system 134 and 120), which may then control the UAV 110 accordingly.

The communication system 134 may be implemented as any wired and/or wireless communications module configured to transmit and receive analog and/or digital signals between elements of the survey system 100. For example, the communication system 134 may be configured to transmit flight control signals from the user interface 132 to communication system 120 or 144 or accessory port system 128 or attached accessory devices capable of communication. In other embodiments, the communication system 134 may be configured to receive sensor data (e.g., visible spectrum and/or infrared still images or video images, or other sensor data) from the sensor payload 140. In some embodiments, the communication system 134 may be configured to support spread spectrum transmissions, for example, and/or multiple simultaneous communications channels between elements of the survey system 100. In various embodiments, the communication system 134 may be configured to monitor the status of a communication link established between the base station 130, the sensor payload 140, and/or the UAV 110 (e.g., including packet loss of transmitted and received data between elements of the survey system 100, such as with digital communication links), as described herein. Such status information may be provided to the user interface 132, for example, or transmitted to other elements of the survey system 100 for monitoring, storage, or further processing.

Other modules 136 of the base station 130 may include other and/or additional sensors, actuators, communications modules/nodes, and/or user interface devices used to provide additional environmental information associated with the base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of the survey system 100 (e.g., logic device 112) to provide operational control of the UAV 110 and/or survey system 100 or to process sensor data to compensate for environmental conditions, such as an water content in the atmosphere approximately at the same altitude and/or within the same area as the UAV 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by the user interface 132).

In embodiments where the imaging system/sensor payload 140 is implemented as an imaging device, the imaging system/sensor payload 140 may include an imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, the imaging module 142 may include one or more logic devices (e.g., similar to the logic device 112) that can be configured to process imagery captured by detector elements of the imaging module 142 before providing the imagery to memory 146 or the communication system 144. More generally, the imaging module 142 may be configured to perform any of the operations or methods described herein, at least in part, or in combination with the logic device 112 and/or user interface 132.

In some embodiments, the sensor payload 140 may be implemented with a second or additional imaging modules similar to the imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to the imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

The communication system 144 of the sensor payload 140 may be implemented as any wired and/or wireless communications module configured to transmit and receive analog and/or digital signals between elements of the survey system 100. For example, the communication system 144 may be configured to transmit infrared images from the imaging module 142 to communication system 120 or 134. In other embodiments, the communication system 144 may be configured to receive control signals (e.g., control signals directing capture, focus, selective filtering, and/or other operation of sensor payload 140) from the logic device 112 and/or user interface 132. In some embodiments, communication system 144 may be configured to support spread spectrum transmissions, for example, and/or multiple simultaneous communications channels between elements of the survey system 100. In various embodiments, the communication system 144 may be configured to monitor and communicate the status of an orientation of the sensor payload 140 as described herein. Such status information may be provided or transmitted to other elements of the survey system 100 for monitoring, storage, or further processing.

The memory 146 may be implemented as one or more machine readable mediums and/or logic devices configured to store software instructions, sensor signals, control signals, operational parameters, calibration parameters, infrared images, and/or other data facilitating operation of the survey system 100, for example, and provide it to various elements of the survey system 100. The memory 146 may also be implemented, at least in part, as removable memory, such as a secure digital memory card for example including an interface for such memory.

An orientation sensor 148 of the sensor payload 140 may be implemented similar to the orientation sensor 114 or gyroscope/accelerometer 116, and/or any other device capable of measuring an orientation of the sensor payload 140, the imaging module 142, and/or other elements of the sensor payload 140 (e.g., magnitude and direction of roll, pitch, and/or yaw, relative to one or more reference orientations such as gravity, Magnetic North, and/or an orientation of the UAV 110) and providing such measurements as sensor signals that may be communicated to various devices of the survey system 100. A gyroscope/accelerometer (e.g., angular motion sensor) 150 of the sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of the sensor payload 140 and/or various elements of the sensor payload 140 and providing such measurements as sensor signals that may be communicated to various devices of the survey system 100.

Other modules 152 of the sensor payload 140 may include other and/or additional sensors, actuators, communications modules/nodes, cooled or uncooled optical filters, and/or user interface devices used to provide additional environmental information associated with the sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by the imaging module 142 or other devices of the survey system 100 (e.g., logic device 112) to provide operational control of the UAV 110 and/or survey system 100 or to process imagery to compensate for environmental conditions.

In general, each of the elements of the survey system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of the survey system 100. In addition, one or more non-transitory mediums may be provided for storing machine readable instructions for loading into and execution by any logic device implemented with one or more of the devices of the survey system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of the survey system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of the survey system 100 may include one or more modules supporting wired, wireless, and/or a combination of wired and wireless communication techniques. In some embodiments, various elements or portions of elements of the survey system 100 may be integrated with each other, for example, or may be integrated onto a single printed circuit board (PCB) to reduce system complexity, manufacturing costs, power requirements, coordinate frame errors, and/or timing errors between the various sensor measurements. Each element of the survey system 100 may include one or more batteries, capacitors, or other electrical power storage devices, for example, and may include one or more solar cell modules or other electrical power generating devices. In some embodiments, one or more of the devices may be powered by a power source for the UAV 110, using one or more power leads. Such power leads may also be used to support one or more communication techniques between elements of the survey system 100.

Figure 2:
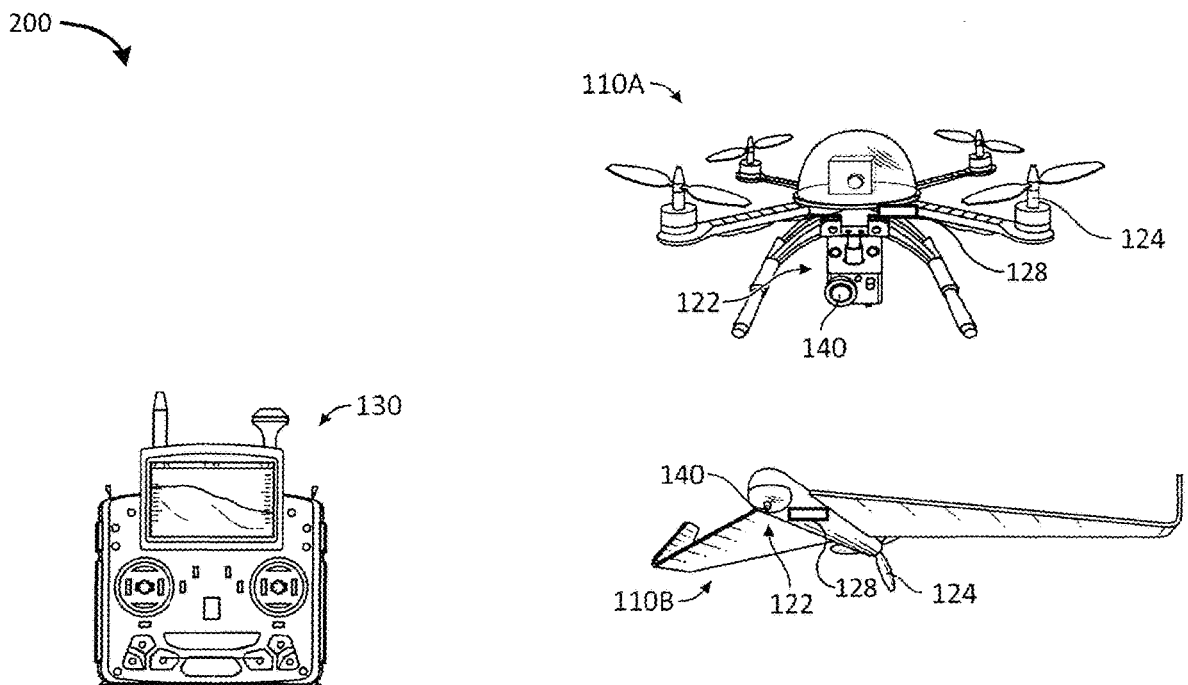
FIG. 2 illustrates a diagram of a survey system in accordance with one or more embodiments of the present disclosure.

FIG. 2 illustrates a diagram of a survey system 200 including UAVs 110A and 110B, each with sensor payloads 140 and associated gimbal systems 122 in accordance with one or more embodiments of the present disclosure. In the embodiment shown in FIG. 2, the survey system 200 includes a base station 130, UAV 110A with articulated imaging system/sensor payload 140 and gimbal system 122, and UAV 110B with articulated imaging system/sensor payload 140 and gimbal system 122, where the base station 130 may be configured to control motion, position, and/or orientation of the UAV 110A, UAV 110B, and/or sensor payloads 140. More generally, the survey system 200 may include any number of the UAVs 110, 110A, and/or 110B.

Figure 3:
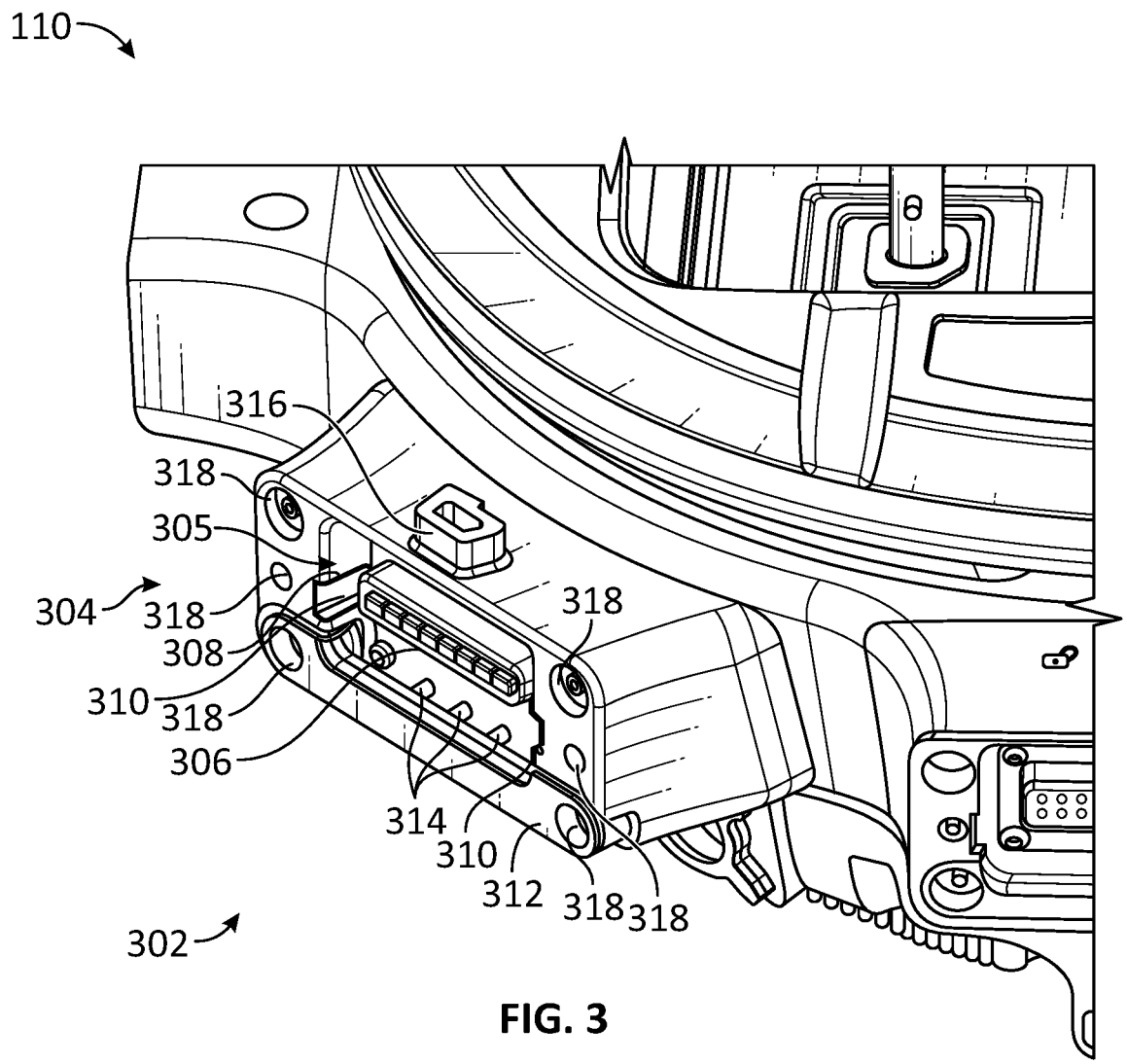
FIG. 3 illustrates an accessory port disposed on a UAV in accordance with one or more embodiments of the present disclosure.

FIG. 3 illustrates a view of an accessory port 302 disposed on the UAV 110 (e.g., a UAV). The accessory port 302 may allow for a plurality of accessory devices to be interchangeably attached to the UAV 110. In some embodiments, the accessory port 302 may be one of a plurality of accessory ports of the accessory port system 128 of the UAV 110 where each accessory port is disposed on the UAV 110 and capable of attaching an accessory device to the UAV 110. The accessory port 302 may be disposed in various locations of the UAV 110 such as in a main structure (e.g., frame, body) of the UAV 110. In some cases, the accessory port 302 may be disposed at one or more quadrants between adjacent rotors such as on a quadrotor/quadcopter type of mobile platform. In some embodiments, two or more accessory ports may be used to attach an accessory device (e.g., the accessory device may be connected to more than one accessory port such as for further balance and stability of the accessory device and/or the UAV 110). For example, accessory ports on opposing sides of a UAV or at each quadrant in a quadrotor/quadcopter type of UAV may be used to attach a single accessory device in some embodiments.

The accessory port 302 may include a mechanical interface 304 configured to engage with one of the plurality of interchangeable accessory devices to the UAV 110 when the accessory device is connected to the accessory port 302. The mechanical interface 304 may have a cavity 305 configured to receive a port interface of the accessory device. The cavity 305 may have an internal surface 308 configured to interface with the port interface of the accessory device. The internal surface 308 may include one or more recesses 310 configured to align the accessory device with the mechanical interface 304 and an electrical interface 306 of the accessory port 302. For example, the recesses 310 may align/guide a protruding member of the port interface of the accessory device into a correct alignment with the electrical interface 306 when the accessory device is connected to the accessory port 302. In some embodiments, the recesses 310 may be disposed in the internal surface 308 to prevent an incorrect alignment with the electrical interface 306. In other words, the recesses 310 may be asymmetrically offset relative to each other or relative to a symmetric point/midline of the cavity 305 such that the accessory device should be oriented in a specific manner to align with the mechanical interface 304 and electrical interface 306 when the accessory device is connected to the accessory port 302.

The mechanical interface 304 may further include an interchangeable and configurable interface portion 312. The interface portion 312 may include members 314 (e.g., mistake-proof features, pins, elements) that prevent installation of an incorrect accessory device and/or prevent incorrect orientation in the installation of an accessory device. For example, if a port interface of the accessory device does not have counterpart features corresponding to members 314, the accessory device may not be able to connect to the accessory device port 302 correctly. The interface portion 312 may be swapped out for different interface portions having various configurations to specify which accessory devices may be connected to the accessory port 302. For example, different interface portions may be physically defined to change a shape of the cavity 305 and internal surface 308 of the mechanical interface 304 such that certain accessory devices that conform to/fit the cavity 305 may be attached to the UAV 110.

The mechanical interface 304 may further include a locking member 316. The locking member 316 may have a profile (e.g., shape, form) configured to physically secure an accessory device to the accessory port 302. For example, the locking member 316 may facilitate physically securing an accessory device to the accessory port 302 by catching a latch disposed on a port interface of the accessory device or otherwise engaging with a complementary member of the port interface of the accessory device. Additional embodiments that include the locking member 316 are discussed herein in reference to the latter figures.

The mechanical interface 304 may further include recesses 318. In some embodiments, one or more of the recesses 318 may be part of insertion through-holes that allow the accessory port 302 to be fastened/fixed to the UAV 110. In various embodiments, recesses 318 may be configured to further align a port interface of an accessory device with the accessory port 302. For example, a port interface of an accessory device may have one or more protruding members configured to fit into recesses 318 such that recesses 318 are able to thereby align the accessory device with the accessory port 302.

The accessory port 302 may further include the electrical interface 306 configured to electrically connect accessory devices to the UAV 110. The various aforementioned aspects of mechanical interface 304 may align an accessory device relative to the electrical interface 306 when the accessory device is connected to the accessory port 302 according to some embodiments. In some cases, power may be provided by the UAV 110 (e.g., from a battery of the UAV 110) to an accessory device attached at the accessory port 302 through the electrical interface 306. For example, in an embodiment, once an accessory device is detected to have been connected to accessory port 302, power may be provided to the connected accessory device, for example, to integrate one or more capabilities/functionality provided by the accessory device into an operation of the UAV 110. In other embodiments, the accessory device may have its own power supply. In cases where the accessory device has its own power supply, the UAV 110 may provide additional power as needed such as when the power supply of the accessory device is depleted or when additional power is needed to use a capability (e.g., an electrical component) of the accessory device. In various embodiments, as further discussed herein, the electrical interface 306 may provide for data transfer between an accessory device and the UAV 110 such as when identification information or other data associated with an accessory device is retrieved by the UAV 110 or when the UAV 110 integrates a capability provided by the accessory device into an operation of the UAV 110.

Figure 4:
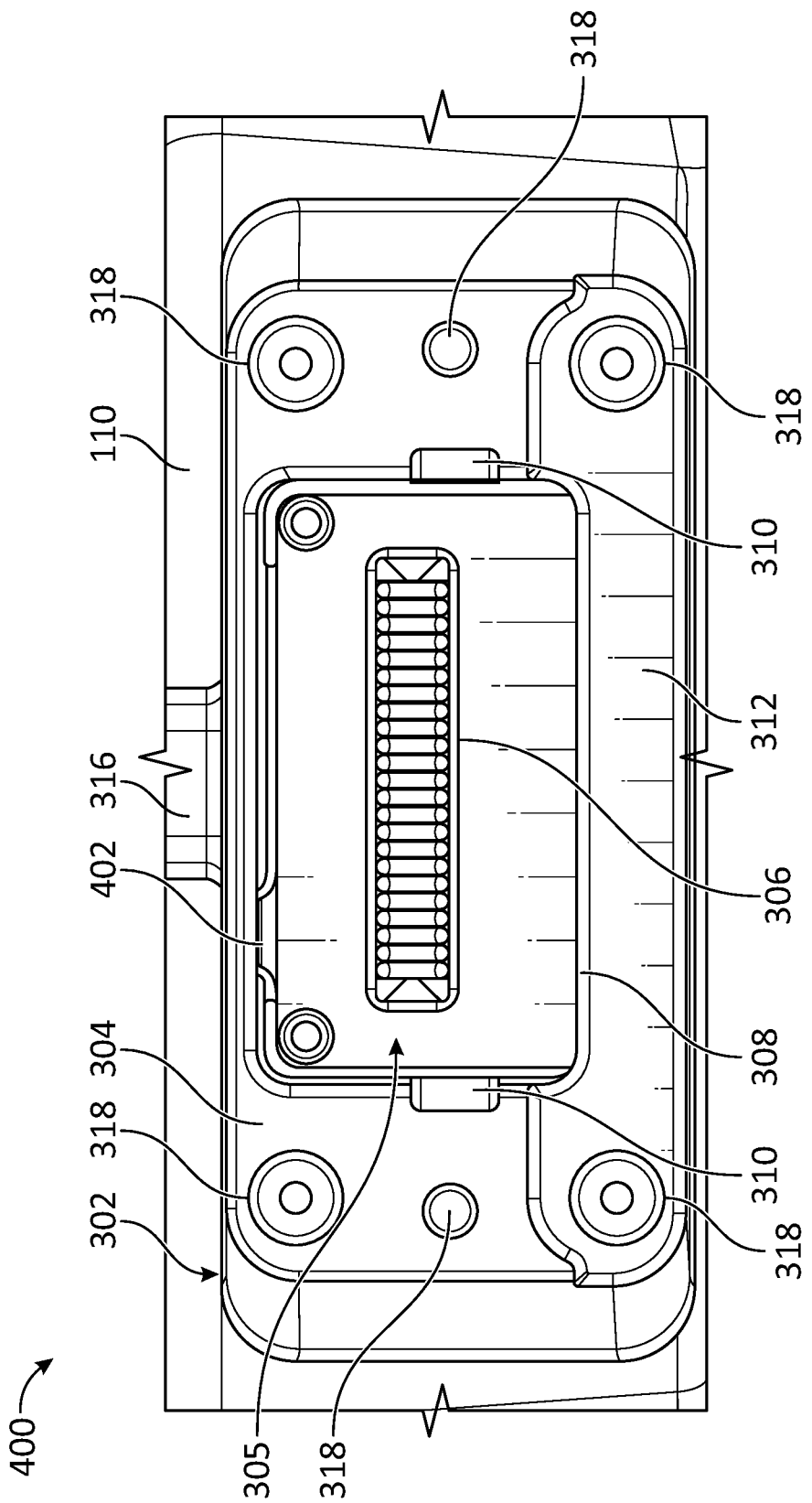
FIG. 4 illustrates an accessory port configuration in accordance with one or more embodiments of the present disclosure.

FIG. 4 illustrates a view 400 of the accessory port 302 in accordance with one or more embodiments of the present disclosure. As shown in FIG. 4, the accessory port 302 may include a sensor 402. In some embodiments, the sensor 402 may be disposed in or adjacent to the cavity 305 of the mechanical interface 304. In some embodiments, the sensor 402 may be configured to detect an engagement of an accessory device with the mechanical interface 304 and/or the electrical interface 306 of the accessory port 302. For example, the sensor 402 may detect a magnetic field induced by a magnet disposed in the accessory device when the accessory device is connected to the accessory port 302. In some embodiments, the sensor 402 may be implemented for mechanical and/or electromechanical detection to detect when an accessory device 302 is connected to the accessory port 302. For example, the sensor 402 may detect when an accessory device is connected to the accessory port 302 through one or more physical contacts (e.g., using a mechanical switch with contact spring and contact pad) and/or one or more electrical connections formed between the sensor 402 and a corresponding electrical component of the accessory device (e.g., via an electrical interface such as power line(s) and/or data line signal(s)). Thus, it will be appreciated that in various embodiments any desired combination of detection signals and/or electrical interface signals may be used to detect an accessory device connected to the accessory port 302 using magnetic fields, physical contacts, and/or electrical connections as appropriate for particular types of accessories or operational environments.

Figure 5:
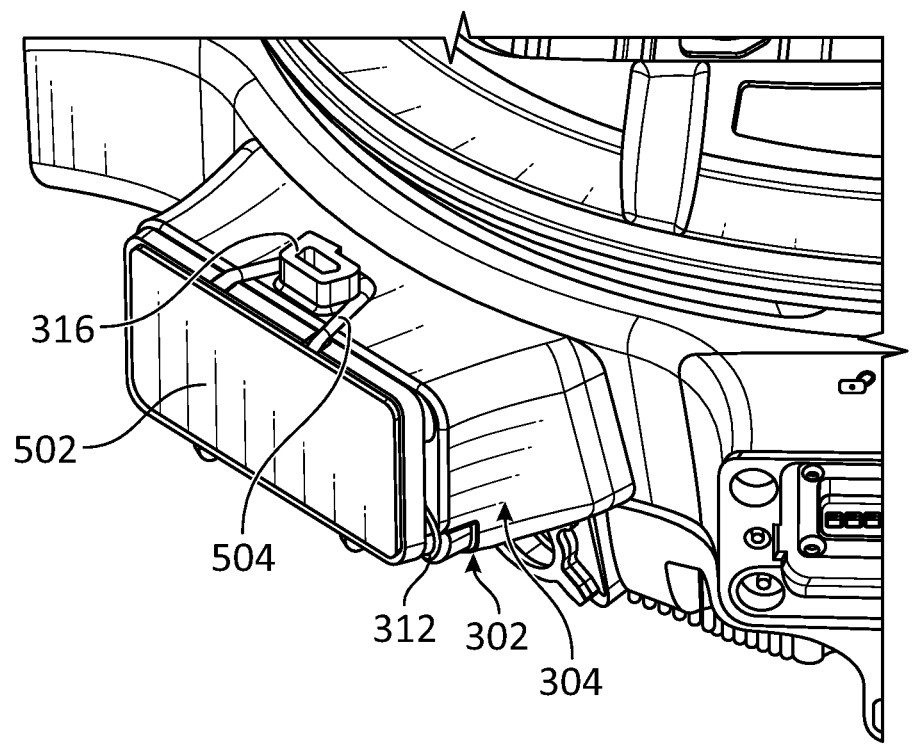
FIG. 5 illustrates an accessory port cover for an accessory port in accordance with one or more embodiments of the present disclosure.

FIG. 5 illustrates an accessory port cover 502 for the accessory port 302 according to one or more embodiments of the present disclosure. The accessory port cover 502 may be used to cover the accessory port 302 when an accessory device is not attached to the accessory port 302. The accessory port cover 502 may include a latch 504 capable of engaging the locking member 316 to secure the accessory port cover 502 over an entry to the accessory port 302. Thus, the accessory port cover 502 may prevent dust, debris, moisture, and weather elements from entering the accessory port 302. In various embodiments, an inner surface of the accessory port cover 502 (e.g., a surface facing the entry of the accessory port 302) may have a port interface capable of engaging with the various aspects of the mechanical interface 304 to align the accessory port cover 502 with the accessory port 302 and create a seal to prevent dust, debris, moisture, and weather elements from entering the accessory port 302.

Figure 6A:
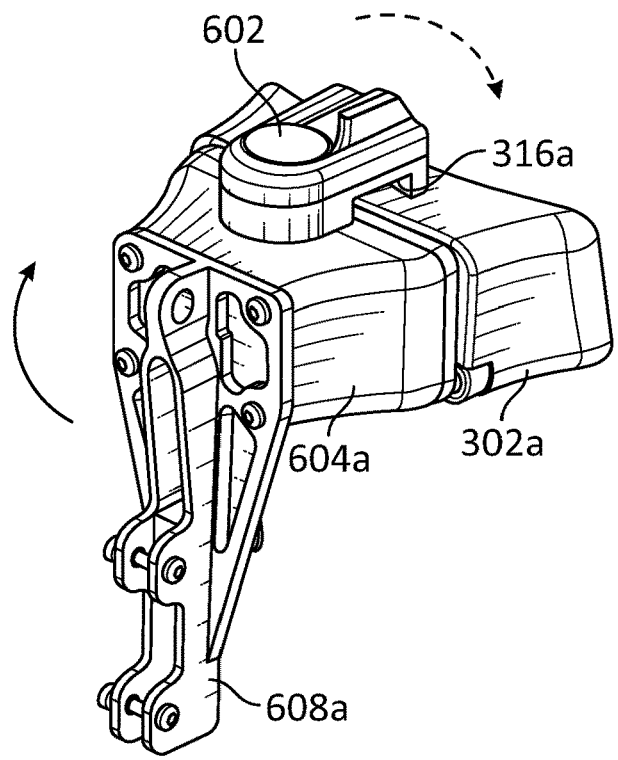
FIGS. 6A-6C illustrate various accessory port and port interface configurations according to embodiments of the present disclosure.
Figure 6B:
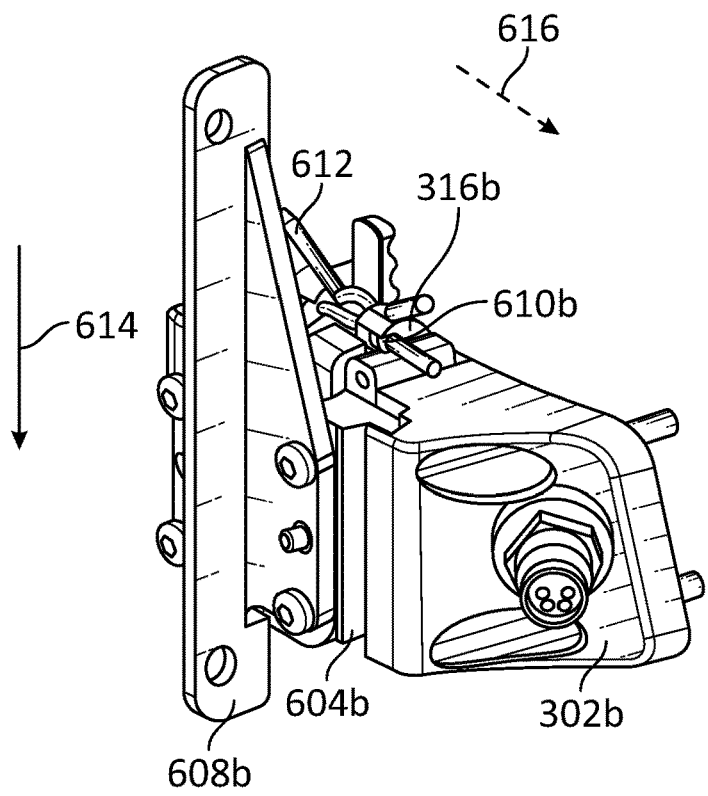
Figure 6C:
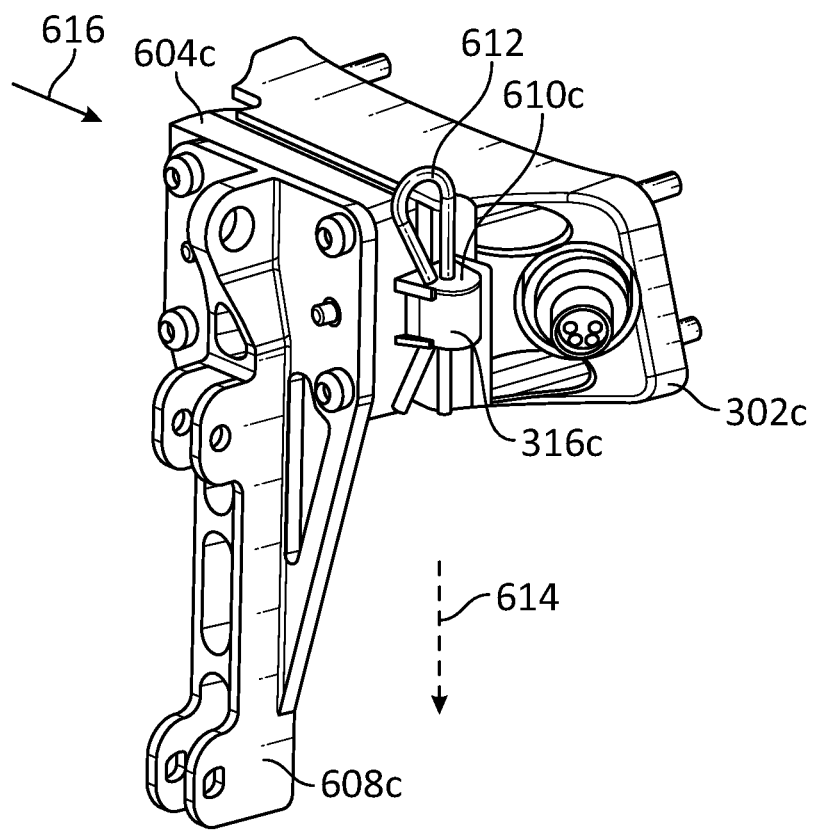

FIGS. 6A-6C illustrate various accessory port and port interface configurations according to embodiments of the present disclosure. In the embodiment shown in FIG. 6A, a port interface 604a may include a rotatable latch 602 and a mounting plate 608a configured to receive an accessory device mounted thereto. A locking member 316a of the accessory port 302a may catch the rotatable latch 602 to physically secure the port interface 604a to the accessory port 302a, and thereby physically secure an accessory device, mounted to the mounting plate 608a, to a UAV that includes the accessory port 302a. In the embodiment shown in FIG. 6B, a locking member 316b may have a snap-hook configuration configured to catch a portion 610b of a port interface 604b and receive a removable socket pin 612 to physically secure the port interface 604b to the accessory port 302b and thereby physically secure any accessory device mounted to the mounting plate 608b of the port interface 604b to a mobile platform. In the embodiment shown in FIG. 6B, the port interface 604b may slide in a vertical direction 614 into the accessory port 302b and the socket pin 612 may be inserted into the locking member 316b from a horizontal direction 616 to physically secure the port interface 604b to the accessory port 302b. Referring to FIG. 6C, in another example embodiment, a locking member 316c may have a snap-hook configuration configured to catch a portion 610c of a port interface 604c and receive a removable socket pint 612 to physically secure the port interface 604c to the accessory port 302c and thereby any accessory device mounted to the mounting plate 608c of the port interface 604c to a mobile platform. In the embodiment shown in FIG. 6C, the port interface 604c may slide in a horizontal direction 616 into the accessory port 302c and the socket pin 612 may be inserted into the locking member 316b in a vertical direction 614 to physically secure the port interface 604c to the accessory port 302c.

Figure 7A:
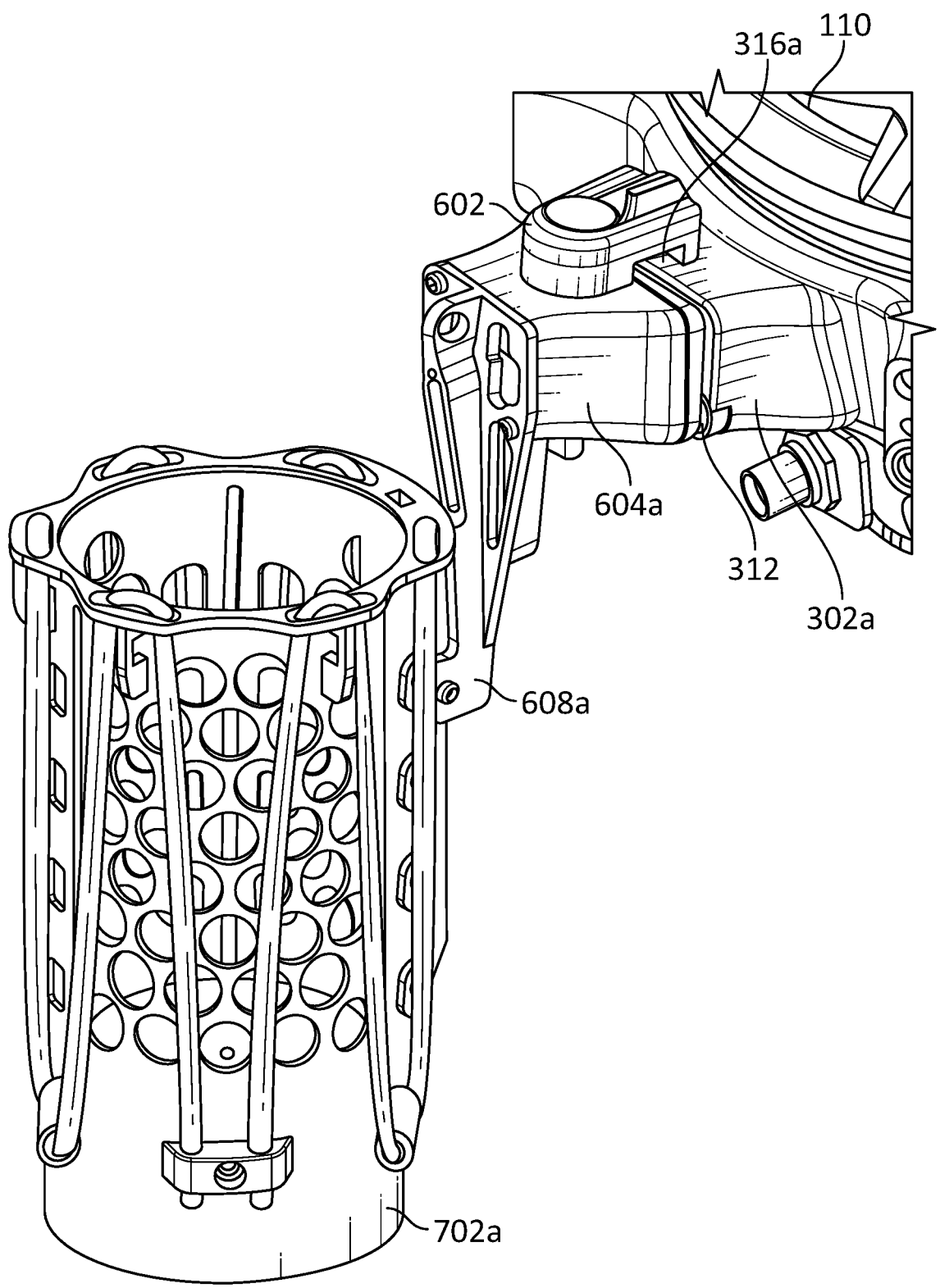
FIGS. 7A-7C illustrate accessory devices which may be attached to a UAV using the accessory port and port interface configurations of FIGS. 6A-6C.
Figure 7B:
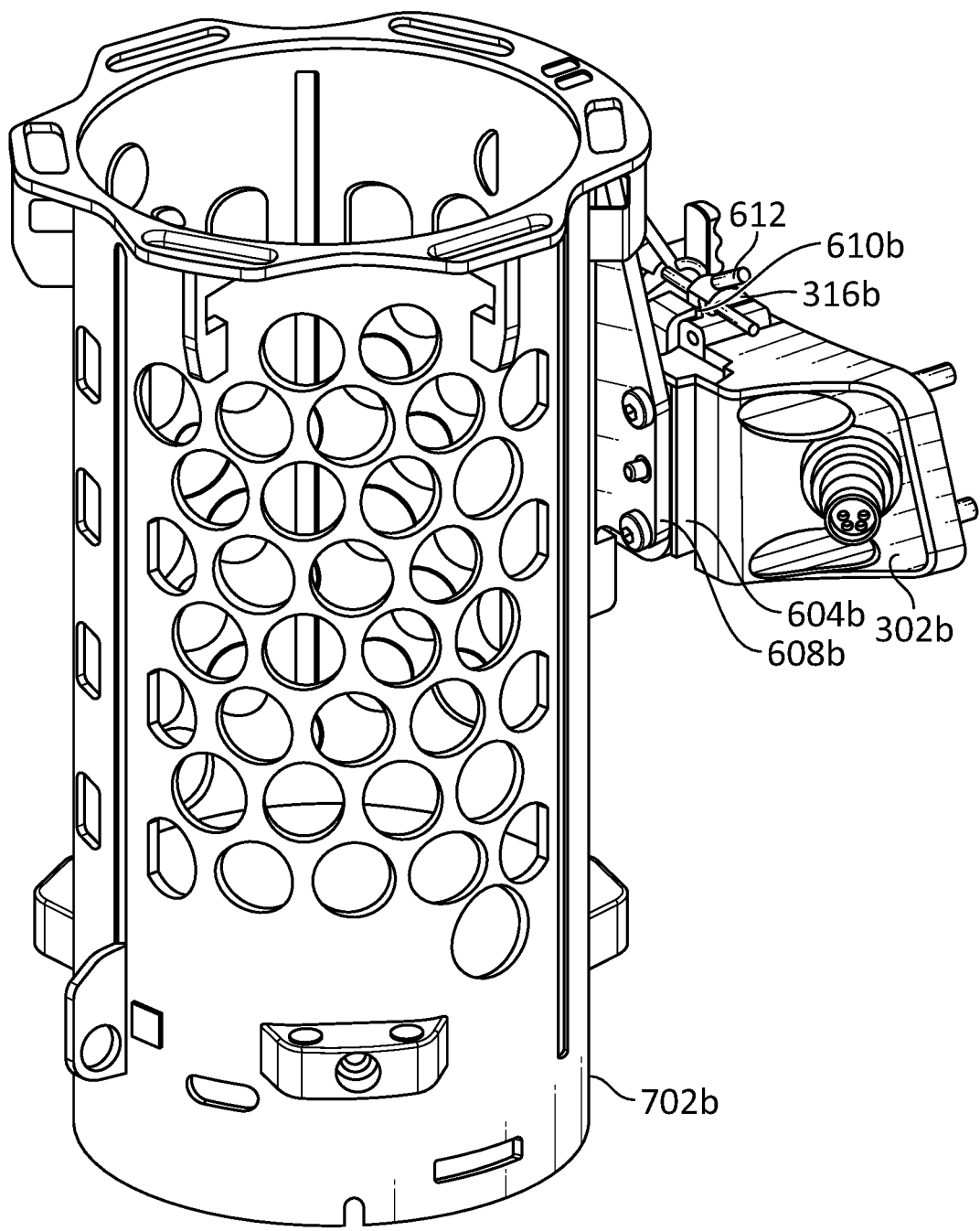
Figure 7C:
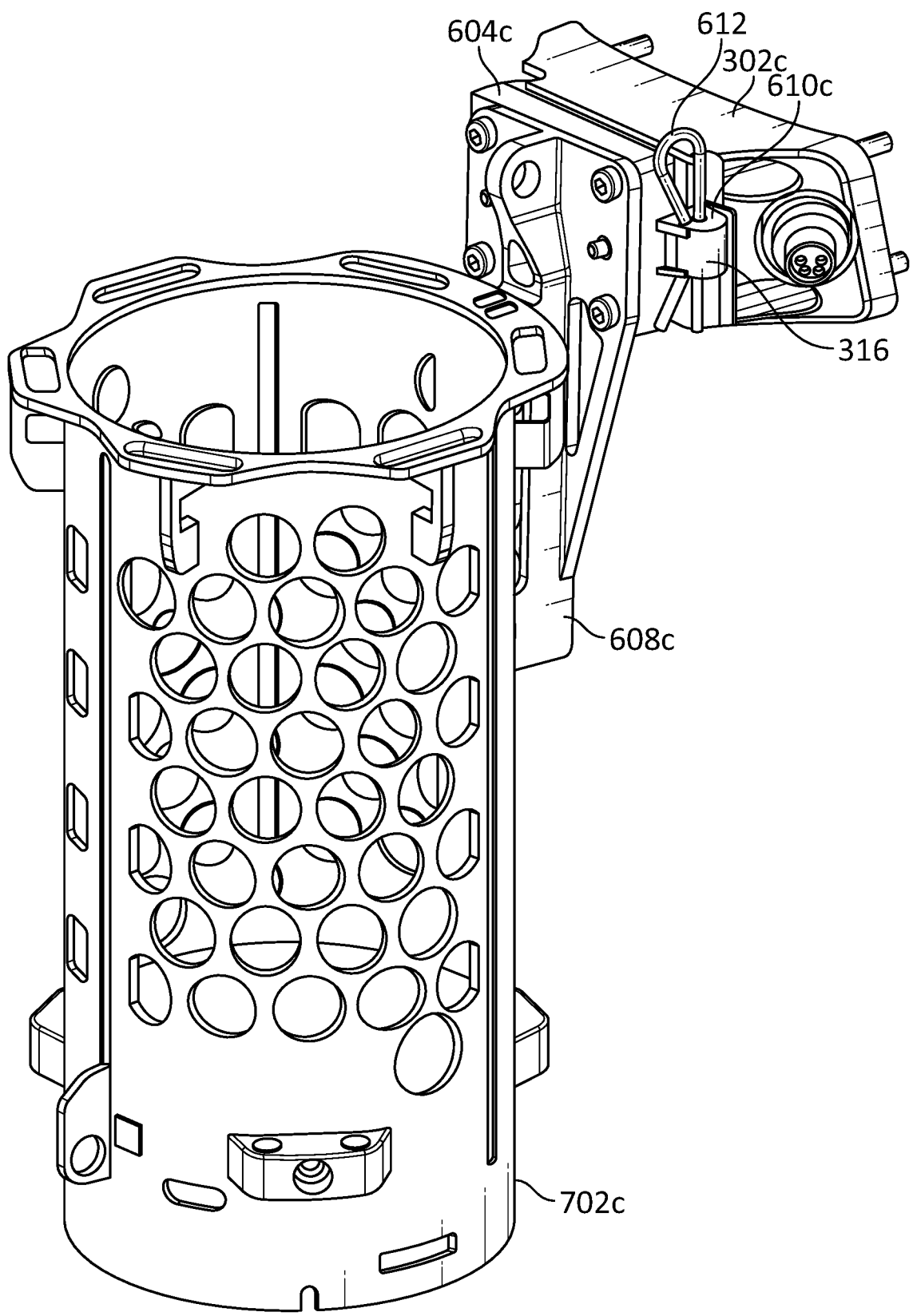

FIGS. 7A-7C illustrate accessory devices 702a-702c which may be attached to a UAV using the port interfaces 604a-604c and accessory ports 302a-302c illustrated in FIGS. 6A-6C. As an example, accessory devices 702a-702c may be various implementations of a receptacle for package delivery using a mobile platform.

Figure 8:
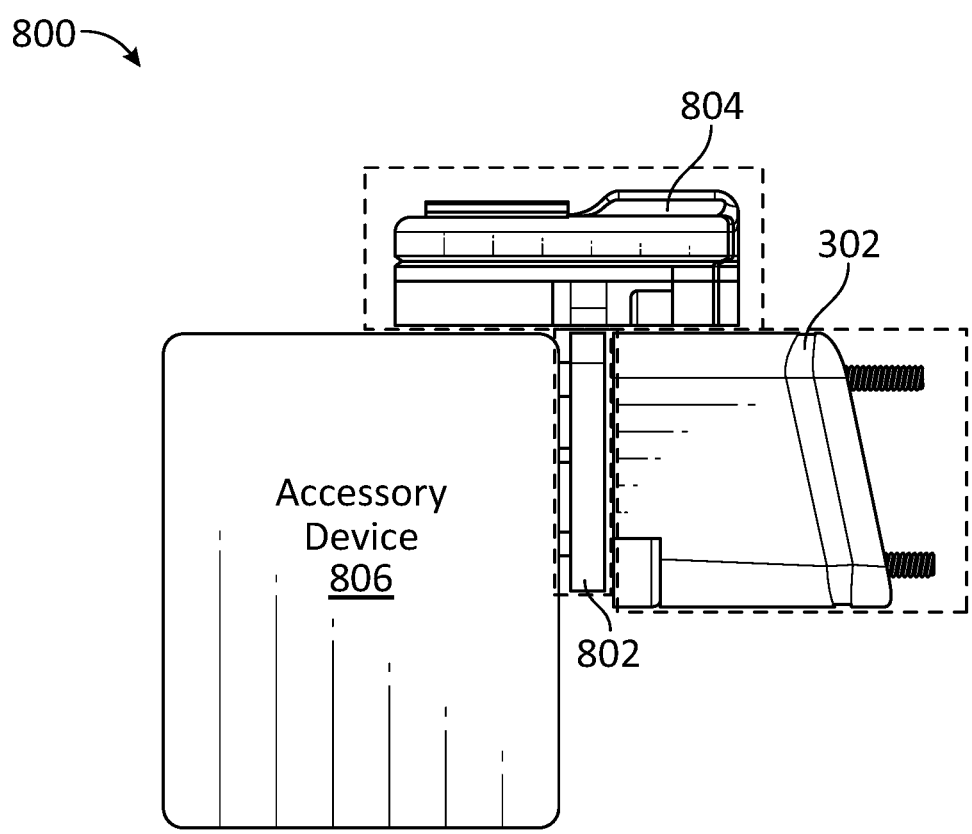
FIG. 8 illustrates a diagram of an accessory device connected to an accessory port via a port interface in accordance with one or more embodiments of the present disclosure.

FIG. 8 illustrates a diagram 800 of an accessory device 806 connected to the accessory port 302 via a port interface 802 in accordance with one or more embodiments of the present disclosure. The port interface 802 may have a latch 804 configured to latch to the locking member 316 of the accessory port 302 as discussed in the present disclosure. The port interface 802 may be attachable to the accessory device 806 to allow the accessory device 806 to attach to a UAV through the accessory port 302. The port interface 802 may be interchangeable such that it may be attached to a plurality of different accessory devices to the UAV 110 to allow any of the accessory devices to attach to the UAV 110 through one of its accessory ports. Thus, when the accessory port 302 has been attached to an accessory device, the accessory device can be swapped between various locations on a UAV 110 where accessory ports are disposed. For example, on a quadcopter UAV 110 where accessory ports are disposed at each quadrant, accessory devices that have been integrated with a port interface 802 may be attached to the UAV 110 in several configurations.

Figure 9:
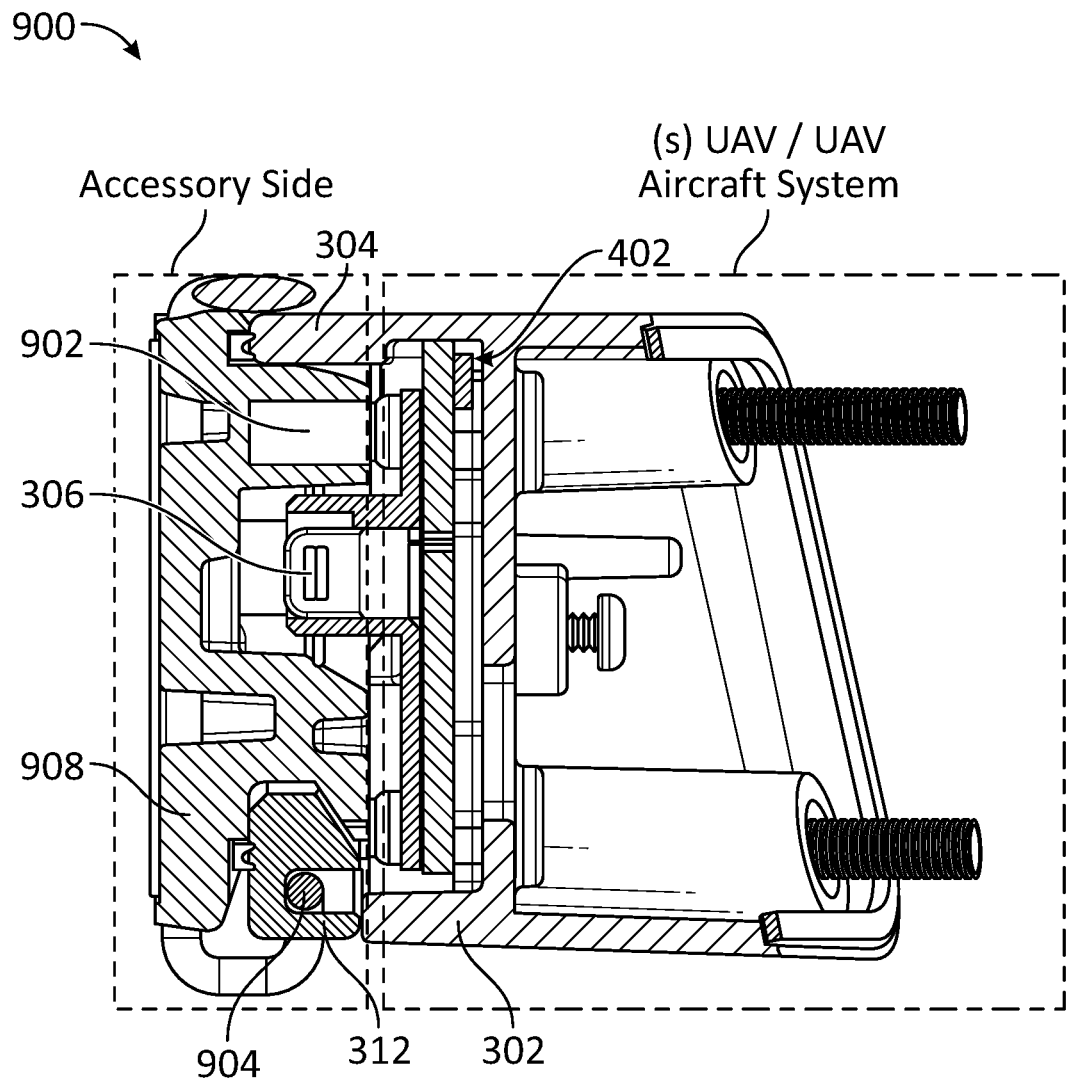
FIG. 9 illustrates a cross-sectional view of a port interface attachable to an accessory device and connected to an accessory port in accordance with one or more embodiments of the present disclosure.

FIG. 9 illustrates a cross-sectional view 900 of a port interface 908 attachable to an accessory device and connected to the accessory port 302 in accordance with one or more embodiments of the present disclosure. In the embodiment shown, the accessory port 302 includes the sensor 402 configured to detect an engagement of the port interface 908 with the accessory port 302 by detecting a magnetic field induced by a magnet 902 disposed in the port interface 908. The port interface 908 may have a protrusion 904 configured to align with members 314 (not shown in FIG. 9) of the interface portion 312 to facilitate connecting the port interface 908 to the accessory port 302. In some embodiments, the specific interface between the protrusion 904 and the members 314 may also prevent installation of an incorrect accessory or prevent incorrect alignment of a compatible accessory.

Figure 10:
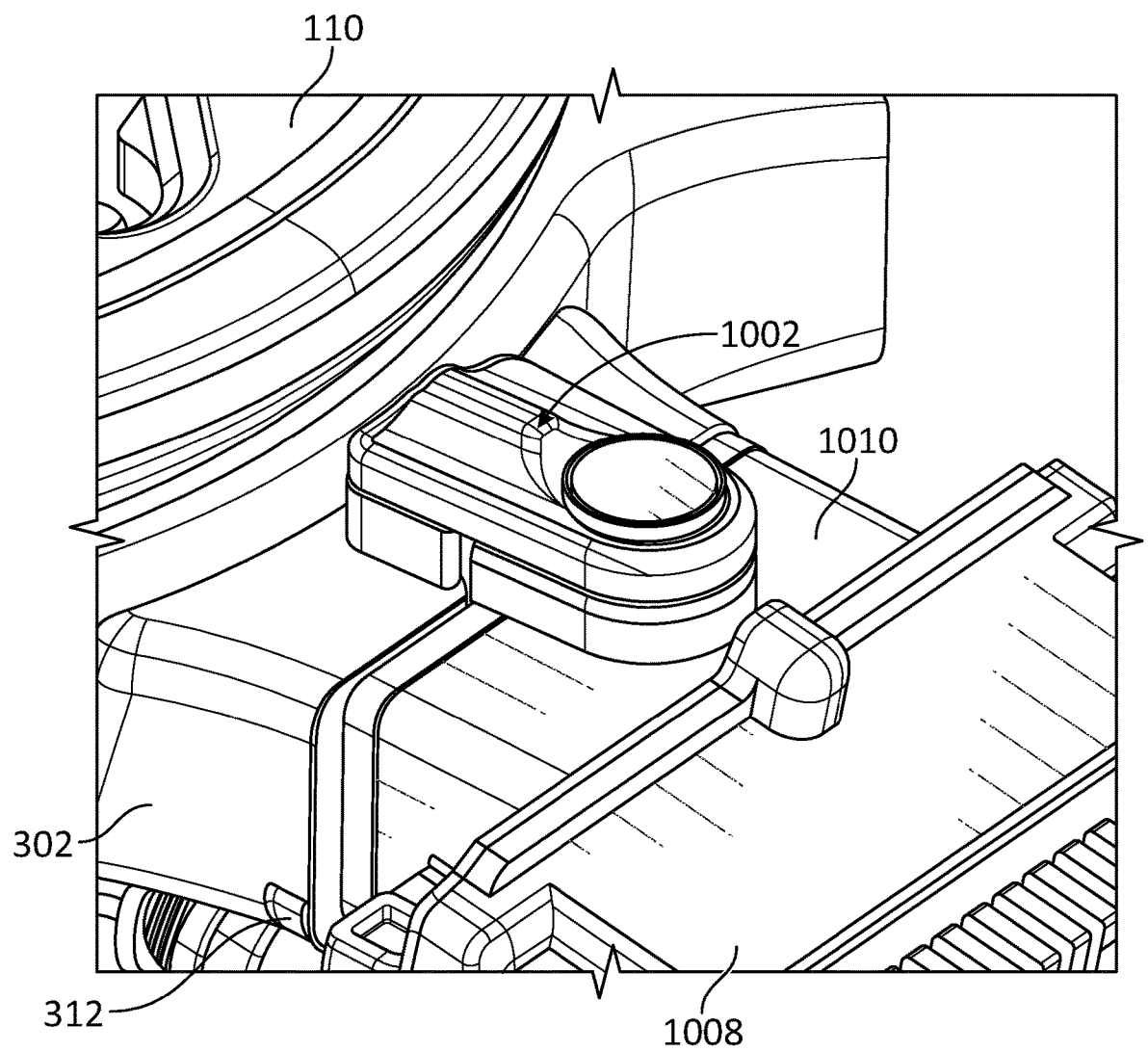
FIGS. 10 and 11 illustrate an accessory device attached to a UAV in accordance with one or more embodiments of the present disclosure.
Figure 11:
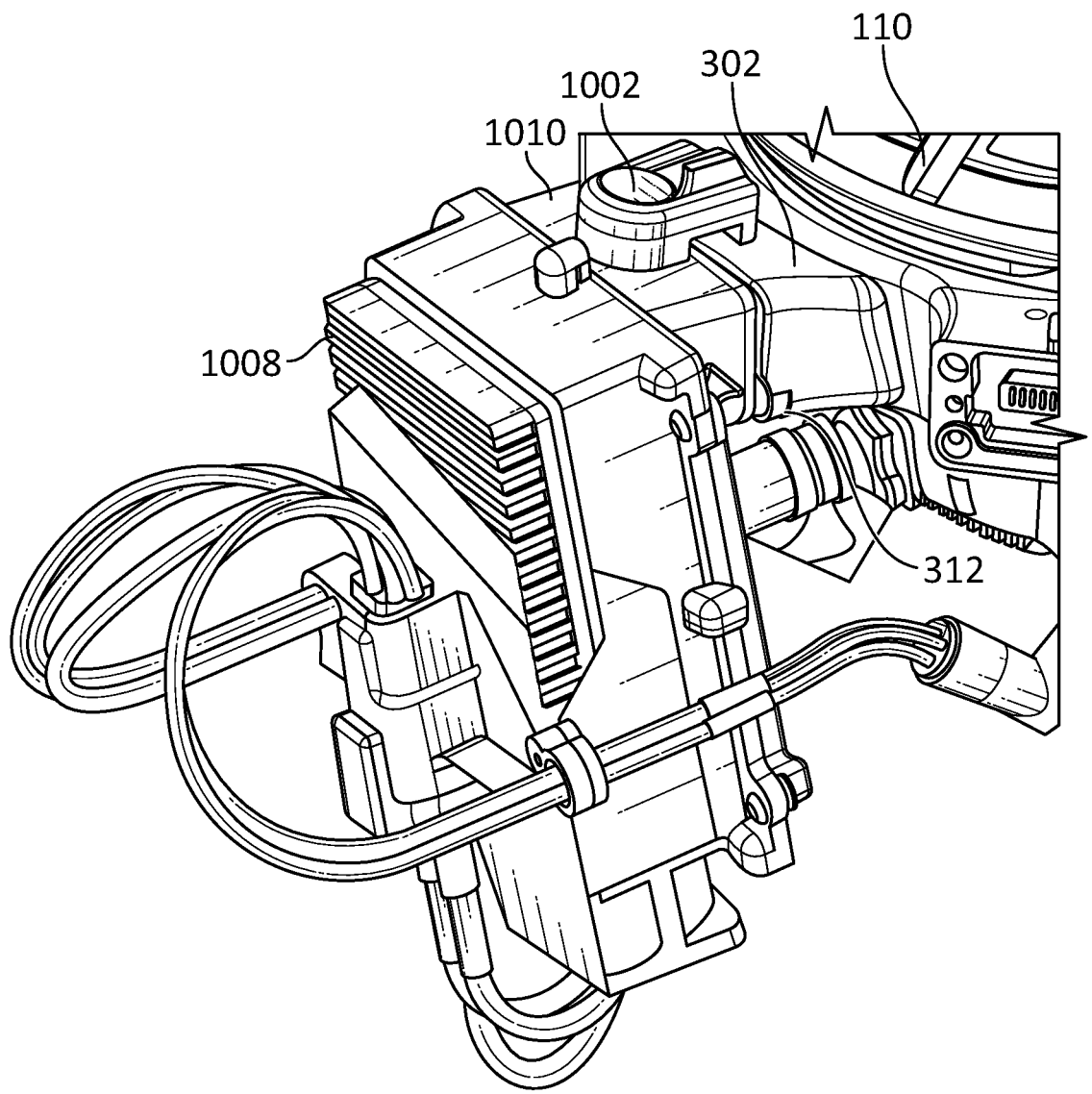

FIGS. 10 and 11 illustrate an accessory device 1008 attached to the UAV 110 in accordance with one or more embodiments of the present disclosure. As shown in FIG. 10, a port interface 1010 (e.g., similar to port interface 604a, 802, and 908) may allow the accessory device 1008 to be connected to the accessory port 302. A latch 1002 (e.g., similar to latch 602 and 804) may be rotated to latch to the locking member 316 of the accessory port 302 to physically secure the port interface 1010 to the accessory port 302 and thereby attach the accessory device 1008 to the UAV 110.

Figure 12:
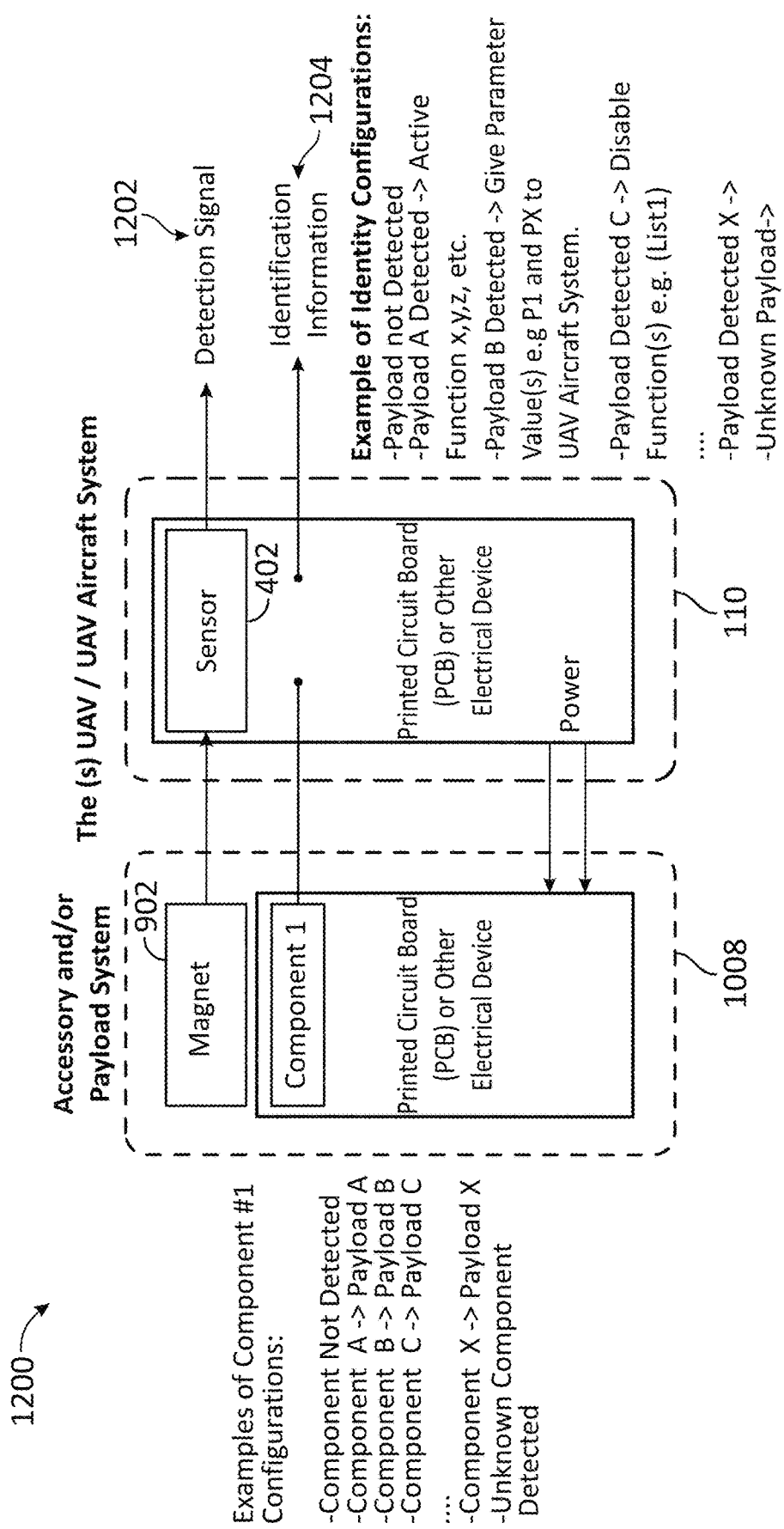
FIG. 12 illustrates a block diagram of an accessory device attached to a UAV in accordance with one or more embodiments of the present disclosure.

FIG. 12 illustrates a block diagram 1200 of an example accessory device 1008 attached to the UAV 110. The sensor 402 may detect an engagement of the accessory device 1008 with a mechanical interface 304 and/or electrical interface 306 of the accessory port 302 of the UAV 110. For example, the sensor 402 may detect a magnetic field induced by the magnet 902 disposed in the accessory device 1008. The sensor 402 may send a detection signal 1202 to the logic device 112 of the UAV 110 indicating that the accessory device 1008 has been connected to the accessory port 302. In response to the detection signal 1202 indicating a presence of the accessory device 1008, the logic device 112 of UAV 110 may retrieve, via the electrical interface 306 of the accessory port 302, identification information 1204 (e.g., an identification signal, identification data) associated with the accessory device 1008. In some embodiments, the identification information 1204 may identify information such as the capabilities/functionality provided by the accessory device 1008, software attributes (e.g., model, version, etc.), communication protocols, and/or physical attributes associated with the accessory device 1008. In some cases, the UAV 110 may provide power to a printed circuit board (e.g., PCB, logic device, IC, EEPROM, etc.) or other electrical device of the accessory device 1008 so that the accessory device 1008 may operate independently or in conjunction with operation of the UAV 110. In other cases, the accessory device 1008 may not require power such as when the accessory device 1008 is a non-electrically operated device.

In an embodiment, the logic device 112 may control the propulsion system 124 of the UAV 110 based at least in part on the physical attributes associated with the accessory device 1008 received in the identification information 1204. For example, the physical attributes may include unit-specific pre-programmed information corresponding to the accessory device 1008 such as mass and a configuration mount type, for example. In some embodiments, a mass may be the mass of the accessory device and a configuration mount type may include the physical vertical mounting location (e.g., a low or high location) and/or dimensions that can affect the flying operation of the UAV 110. The mass, configuration mount type, and/or other physical attributes corresponding to the accessory device 1008 may be included as functional parameters used in controlling the propulsion system 124 of the UAV 110. For example, the logic device 112 may compute a new system-level moment of inertia based at least in part on the mass and configuration mount type parameters of the attached accessory device 1008 and adjust the propulsion system 124 to provide the desired navigational control over the UAV 110 based on the computed moment of inertia.

In an embodiment, the logic device 112 may communicate the identification information to the base station 130, via communication systems 120 and 134, so that the capabilities provided by the accessory device 1008 may be displayed on the user interface 132 for a user to select/configure for integration into an operation of the UAV 110. For example, the user interface 132 may display a notification to the user indicating which accessory device has been attached to the UAV 110 and list capabilities available to integrate into the operation of the UAV 110. The user may select one or more capabilities for integration into the operation of the UAV 110 and send instructions to the UAV 110 from the base station 130 to integrate the one or more capabilities into the operation of the UAV 110.

The UAV 110 may receive the instructions from the base station to integrate the capability of the accessory device 1008 into the operation of the UAV 110. If needed, the UAV 110 may retrieve (e.g., download) additional data (e.g., functional parameter sets(s), instructions, etc.) from the accessory device 1008 to integrate the capability into the operation of the UAV 110. For example, the logic device 112 of the UAV 110 may retrieve functional parameter set(s) from the accessory device 1008 to incorporate as parameters in the operation of the UAV 110. In some cases, the functional parameters may be new functional parameters that are integrated into an operation of the UAV 110. In some cases, the functional parameters downloaded from the accessory device 1008 may be used to update/change existing functional parameters of the UAV 110. In other cases, there may be a combination approach of changing certain existing functional parameters and using newly created functional parameters when integrating capabilities of the accessory device 1008. Thus, the UAV may adjust its operation based on functional parameter set(s) retrieved from the accessory device 1008.

As one example of integrating capabilities, the accessory device 1008 may have a capability altering communications for the UAV 110. For example, the capability may include disabling a communication for the UAV 110 over certain channel frequencies and enabling a communication over one or more different channel frequencies. In some cases, the communication over the one or more different channel frequencies may be through an independent communication system of the accessory device 1008 rather than the communication system 120 of the UAV 110. As an illustration, when the accessory device 1008 is connected to the UAV 110, the communication frequencies of the UAV 110 such as, for example, 915 MHz, 922 MHz, 2.2 GHz, 2.48 GHz, etc. may be disabled and an additional external power source (e.g., a power connector) may be enabled to provide power to the accessory device 1008, via the electrical interface 306 of the accessory port 302, to allow for communication through a radio module of the accessory device 1008 over predefined other channel frequencies.

In another embodiment, the accessory device 1008 may have a capability of disabling certain lights of the UAV 110 to allow for a low visibility "stealth" mode of operation. For example, the accessory device 1008 capability may include downloadable functional parameters for disabling navigation lights of the UAV 110, such as red and greening flashing lights used to indicate an orientation of the UAV 110, while providing a user with additional ways to determine the orientation of the mobile platform. Thus, the UAV 110 may be operated without attention-drawing lights in the "stealth" mode of operation provided by the attachment of the accessory device 1008.

Figure 13:
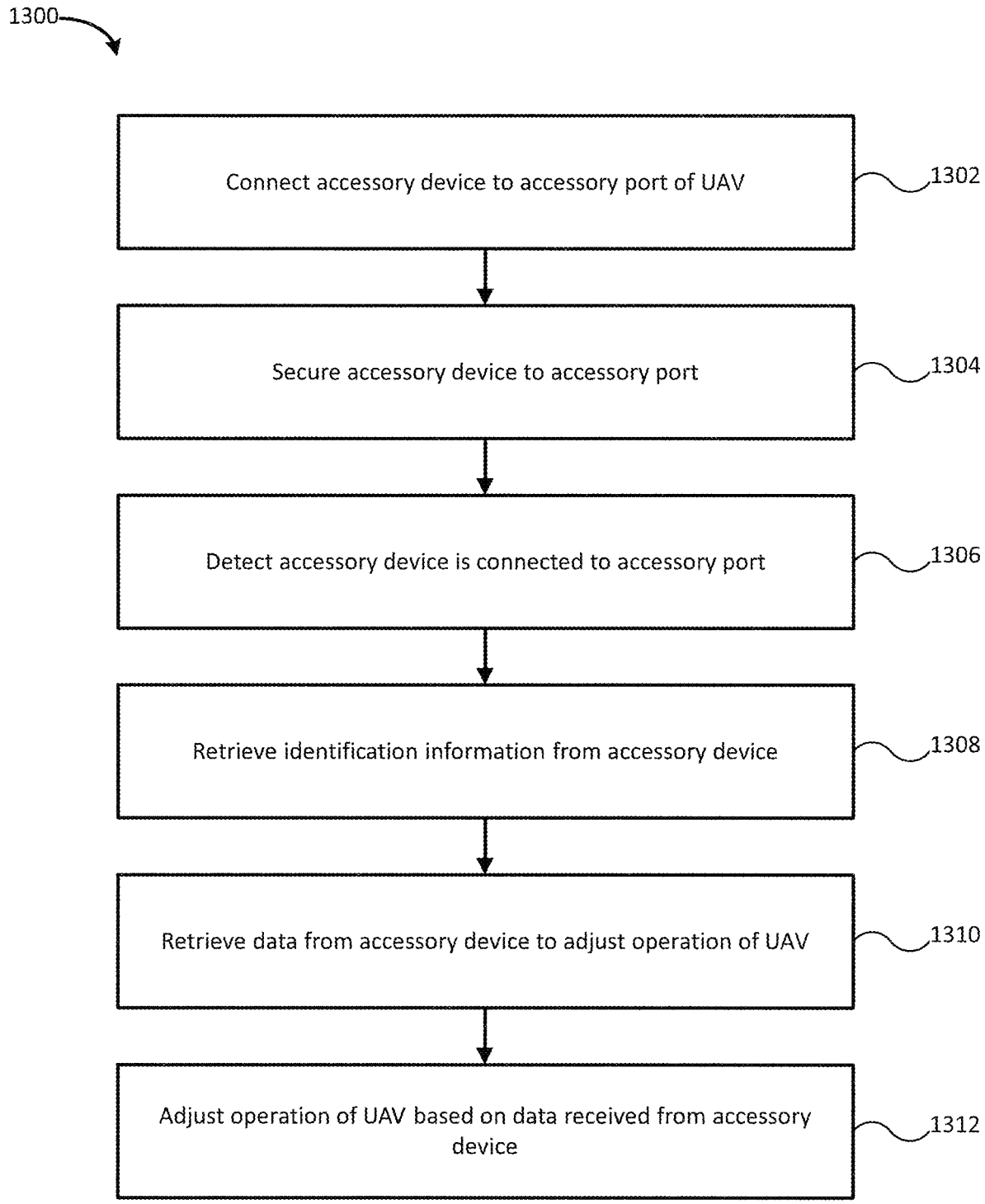
FIG. 13 illustrates a flow diagram of a process for operating a UAV in accordance with one or more embodiments of the present disclosure.

FIG. 13 illustrates a flow diagram of an example process 1300 for operating a UAV in accordance with one or more embodiments of the present disclosure. Note that one or more operations in FIG. 13 may be combined, omitted, and/or performed in a different order as desired.

At block 1302, an accessory device may be connected to an accessory port of an unmanned aerial vehicle (UAV). For example, the accessory device may be connected to an accessory port in accordance with one or more of the embodiments discussed in the present disclosure in reference to FIGS. 3-12.

At block 1304, the accessory device may be secured to the accessory port. For example, the accessory device may be secured to the accessory port in accordance with one or more of the embodiments discussed in the present disclosure in reference to FIGS. 3-12.

At block 1306, the UAV may detect that the accessory device is connected to the accessory port. For example, the UAV may detect that the accessory device is connected to the accessory port in accordance with one or more of the embodiments discussed in the present disclosure in reference to FIGS. 3-12.

At block 1308, the UAV may retrieve identification information from the accessory device. For example, the UAV may retrieve identification information from the accessory device in accordance with one or more of the embodiments discussed in the present disclosure in reference to FIGS. 3-12.

At block 1310, the UAV may retrieve data from the accessory device to adjust an operation of the UAV. For example, the UAV may retrieve data that may be used in operating the UAV in accordance with one or more embodiments discussed in the present disclosure in reference to FIGS. 3-12.

At block 1312, the UAV may adjust its operation based on the data retrieved from the accessory device. For example, the UAV may adjust its operation based on data retrieved from the accessory device in accordance with one or more embodiments discussed in the present disclosure in reference to FIGS. 3-12.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An unmanned aerial vehicle (UAV) comprising:
   an accessory port configured to interchangeably attach a plurality of accessory devices to the UAV, wherein the accessory port comprises:
   a mechanical interface configured to engage with one of the accessory devices, wherein the mechanical interface comprises a locking member configured to physically secure the accessory device to the accessory port; and an electrical interface configured to electrically connect the accessory device to the UAV, wherein the mechanical interface is configured to align the accessory device relative to the electrical interface;

wherein the UAV further comprises a logic device configured to retrieve, via the electrical interface, identification information associated with the accessory device in response to a detection of a presence of the accessory device; and wherein the identification information includes information on a mass and/or configuration mount type corresponding to the accessory device, the configuration mount type including a mounting location and/or dimensions affecting a flying operation of the UAV.

2. The UAV of claim 1, wherein the mechanical interface further comprises a sensor configured to detect an engagement of the accessory device with the mechanical interface.

3. The UAV of claim 1, further comprising:
a propulsion system configured to provide motive force to the UAV for navigation about an environment; and
wherein the logic device is configured to control the propulsion system to navigate the UAV based at least on the mass and/or the mounting location and/or the dimensions.

4. The UAV of claim 1, wherein the identification information identifies a capability provided by the accessory device, and wherein the logic device is configured to integrate the capability into an operation of the UAV.

5. The UAV of claim 4, further comprising a communication system configured to communicate over first channel frequencies, wherein the capability comprises:
disabling a communication over the first channel frequencies; and
enabling a communication over a second channel frequency different than the first channel frequencies, wherein the communication over the second channel frequency is through a communication system of the accessory device.

6. The UAV of claim 4, further comprising a communication system configured to communicate with a base station, wherein the logic device is configured to:
send to the base station, via the communication system, a notification of the detection of the accessory device and the associated identification information; and
receive from the base station, via the communication system, instructions to integrate the capability into the operation of the UAV.

7. The UAV of claim 1, further comprising:
a propulsion system configured to provide motive force to the UAV for navigation about an environment;
wherein the logic device is configured to:
compute a moment of inertia based at least in part on the mass and/or the configuration mount type; and
control the propulsion system based at least in part on the moment of inertia.

8. The UAV of claim 1, wherein the locking member is configured to catch a rotating latch disposed on the accessory device to physically secure the accessory device to the accessory port.

9. The UAV of claim 1, wherein the locking member comprises a snap-hook configured to catch a portion of the accessory device and receive a removable socket pin to physically secure the accessory device to the accessory port.

10. The UAV of claim 1, further comprising the accessory device, wherein the UAV is configured to provide electrical power to the accessory device through the electrical interface.

11. A method comprising:
connecting an accessory device to an accessory port of an unmanned aerial vehicle (UAV), wherein the accessory port is configured to interchangeably attach a plurality of accessory devices to the UAV, and wherein the connecting the accessory device to the accessory port comprises:
engaging the accessory device with a mechanical interface of the accessory port, wherein the mechanical interface comprises a locking member configured to physically secure the accessory device to the accessory port; and
electrically connecting the accessory device to an electrical interface of the accessory port, wherein the mechanical interface aligns the accessory device relative to the electrical interface in the electrically connecting;
wherein the method further comprises retrieving, via the electrical interface, identification information associated with the accessory device in response to a detection of a presence of the accessory device; and
wherein the identification information includes information on a mass and/or configuration mount type corresponding to the accessory device, the configuration mount type including a mounting location and/or dimensions affecting a flying operation of the UAV.

12. The method of claim 11, further comprising detecting, via a sensor disposed in the mechanical interface, the engagement of the accessory device with the mechanical interface.

13. The method of claim 11, further comprising:
controlling a propulsion system of the UAV based at least on the mass and/or the mounting location and/or the dimensions.

14. The method of claim 11, wherein the identification information identifies a capability provided by the accessory device, and wherein the method further comprises integrating the capability into an operation of the UAV.

15. The method of claim 14, wherein the UAV comprises a communication system configured to communicate over first channel frequencies, and wherein the capability comprises:
disabling a communication over the first channel frequencies; and
enabling a communication over a second channel frequency different than the first channel frequencies, wherein the communication over the second channel frequency is through a communication system of the accessory device.

16. The method of claim 14, wherein the UAV comprises a communication system configured to communicate with a base station, and wherein the method further comprises:
sending to the base station, via the communication system, a notification of the detection of the accessory device and the associated identification information; and
receiving from the base station, via the communication system, instructions to integrate the capability into the operation of the UAV.

17. The method of claim 11, further comprising:
computing, by a logic device in the UAV, a moment of inertia based at least in part on the mass and/or the configuration mount type; and
controlling, by the logic device, a propulsion system of the UAV based at least in part on the moment of inertia.

18. The method of claim 11, further comprising physically securing the accessory device to the accessory port by catching, by the locking member, a rotatable latch disposed on the accessory device.

19. The method of claim 11, further comprising providing, by the UAV, electrical power to the accessory device through the electrical interface.

20. An unmanned aerial vehicle (UAV) comprising:
- an accessory port configured to interchangeably attach a plurality of accessory devices to the UAV, wherein the accessory port comprises:
  - a mechanical interface configured to engage with one of the accessory devices, wherein the mechanical interface comprises a locking member configured to physically secure the accessory device to the accessory port; and
  - an electrical interface configured to electrically connect the accessory device to the UAV, wherein the mechanical interface is configured to align the accessory device relative to the electrical interface;
- wherein the UAV further comprises:
  - a propulsion system configured to provide motive force to the UAV for navigation about an environment; and
  - a logic device configured to:
    - retrieve, via the electrical interface, physical attributes associated with the accessory device in response to a detection of a presence of the accessory device;
    - compute a moment of inertia based at least in part on the physical attributes; and
    - control the propulsion system based at least in part on the moment of inertia.

* * * * *